US009637104B2

(12) United States Patent
Couppee et al.

(10) Patent No.: US 9,637,104 B2
(45) Date of Patent: May 2, 2017

(54) VALVE APPARATUS

(71) Applicant: WABCO GmbH, Hannover (DE)

(72) Inventors: Ulrich Couppee, Coppenbruegge (DE);
Jan Gensink, Garbsen (DE);
Bernd-Joachim Kiel, Wunstorf (DE)

(73) Assignee: WABCO GmbH, Hannover (DE)

(*) Notice: Subject to any disclaimer, the term of this patent is extended or adjusted under 35 U.S.C. 154(b) by 0 days.

(21) Appl. No.: 15/022,667

(22) PCT Filed: Aug. 28, 2014

(86) PCT No.: PCT/EP2014/002343
§ 371 (c)(1),
(2) Date: Mar. 17, 2016

(87) PCT Pub. No.: WO2015/043710
PCT Pub. Date: Apr. 2, 2015

(65) Prior Publication Data
US 2016/0229384 A1 Aug. 11, 2016

(30) Foreign Application Priority Data
Sep. 24, 2013 (DE) .................. 10 2013 015 830

(51) Int. Cl.
F16K 31/02 (2006.01)
B60T 15/34 (2006.01)
(Continued)

(52) U.S. Cl.
CPC .............. B60T 15/34 (2013.01); B60T 8/361 (2013.01); B60T 15/18 (2013.01); B60T 17/008 (2013.01)

(58) Field of Classification Search
CPC ...... B60T 8/3605; B60T 8/3675; B60T 8/361; B60T 15/34; B60T 15/18; B60T 17/008
(Continued)

(56) References Cited

U.S. PATENT DOCUMENTS 3,977,734 A * 8/1976 Ronnhult .............. B60T 8/3605
137/627.5
3,991,573 A 11/1976 Harries
(Continued)

FOREIGN PATENT DOCUMENTS

DE 10 2011 114 070 A1 3/2013
EP 0 304 610 A2 3/1989
(Continued)

OTHER PUBLICATIONS

European Patent Office, Rijswijk, Netherlands, International Search Report of International Application No. PCT/EP2014/002343, mailed Oct. 16, 2014, 3 pages.

Primary Examiner — Mary McManmon
Assistant Examiner — Minh Le
(74) Attorney, Agent, or Firm — Brinks Gilson & Lione

(57) ABSTRACT

A valve apparatus 1 for a pressure-actuated system has a pressure medium input 7 and a pressure medium output 22. A relay valve 8 controls the pressure medium input 7. A pressure-actuatable inlet valve 23 is arranged between the relay valve 8 and the pressure medium output 22. Each pressure medium output 22 includes a pressure-actuatable outlet valve 28 controlling a fluidic connection of the pressure medium output 22 to a purge 16 leading to atmosphere. At least one outlet valve 28 or inlet valve 23 is formed as a diaphragm valve and has a valve diaphragm 29 which lies on a valve seat 30 and opens against the pressure in a purge chamber 31. For each diaphragm valve, an electrically actuatable purge valve 33 controls a fluidic connection of the purge chamber 31 to a purge line controlling the relay valve 8.

11 Claims, 3 Drawing Sheets

(51) Int. Cl.
*B60T 15/18* (2006.01)
*B60T 17/00* (2006.01)
*B60T 8/36* (2006.01)

(58) Field of Classification Search
USPC .............. 137/488, 596.14, 596.16, 596.17; 303/118.1, 119.1
See application file for complete search history.

(56) References Cited

U.S. PATENT DOCUMENTS

| | | | |
|---|---|---|---|
| 4,643,491 A | | 2/1987 | McCann et al. |
| 4,740,041 A | * | 4/1988 | Pannbacker ............... B60T 8/72 303/119.2 |
| 5,100,208 A | * | 3/1992 | Angermair ................ B60T 8/36 303/118.1 |
| 5,118,169 A | * | 6/1992 | Moller .................. B60T 15/027 303/118.1 |
| 5,443,306 A | * | 8/1995 | Broome .................. B60T 8/327 303/113.4 |
| 5,733,018 A | * | 3/1998 | Goebels ................ B60T 15/027 303/118.1 |
| 6,209,971 B1 | * | 4/2001 | Ho .......................... B60T 8/343 303/119.2 |
| 6,267,135 B1 | | 7/2001 | Ho |
| 6,659,129 B1 | | 12/2003 | Kiel et al. |
| 9,039,103 B2 | | 5/2015 | Grebe et al. |
| 9,180,849 B2 | * | 11/2015 | Grebe .................. B60T 8/3605 |
| 2005/0110342 A1 | * | 5/2005 | Eberling ............... B60T 17/081 303/115.1 |
| 2012/0175944 A1 | * | 7/2012 | Grebe .................. B60T 8/3605 303/119.1 |

FOREIGN PATENT DOCUMENTS

| | | |
|---|---|---|
| EP | 0 443 150 A1 | 8/1991 |
| EP | 0 498 584 A1 | 8/1992 |
| JP | H0858546 A | 3/1996 |
| WO | 91/09760 A1 | 7/1991 |

* cited by examiner

VALVE APPARATUS

TECHNICAL FIELD

The invention concerns a valve apparatus for a pressure-actuated system, in particular the brake system of a motor vehicle, with a pressure medium input to which a pressure source can be connected, and with a relay valve which controls the pressure medium input and can be actuated via a control input of the valve apparatus, with at least one pressure medium output to which a consumer can be connected, with for each pressure medium output a pressure-actuated outlet valve which controls a fluidic connection of the pressure medium output to a main purge leading to atmosphere of the valve apparatus, and for each pressure medium output a pressure-actuated inlet valve arranged between the relay valve and the pressure medium output, wherein at least one outlet valve and/or at least one inlet valve is formed as a diaphragm valve and has as a closing member a valve diaphragm which lies on a valve seat and opens against the pressure in a purge chamber of the outlet valve or against the pressure in a purge chamber of the inlet valve, wherein each diaphragm valve is assigned an electrically actuatable valve which controls a fluidic connection of the purge chamber to a purge line.

BACKGROUND OF THE INVENTION

EP 0 994 003 B1 discloses such a valve apparatus for a pressure-actuated motor vehicle brake system. The known valve apparatus has a pressure medium input to which a pressure source can be connected. A consumer, for example a brake cylinder acting on the wheels of the vehicle, is connected to the pressure medium output. The pressure medium input is controlled by a relay valve which can be actuated via a control input of the valve apparatus. The relay valve comprises a relay piston which, on pneumatic actuation via the control input, repels a valve ring against the return force of a valve spring, whereby the pressure medium input is opened. A pressure-actuatable inlet valve is arranged between the relay valve and the pressure medium output, i.e. the consumer connected to the pressure medium output. The known valve apparatus furthermore comprises a pressure-actuatable outlet valve which controls a fluidic connection of the pressure medium output to a purge of the valve apparatus leading to atmosphere, i.e. connected to the environment of the valve apparatus. This outlet valve is formed as a diaphragm valve and has as a closing member a valve diaphragm which lies on a valve seat and opens against the pressure in a purge chamber of the outlet valve, and in the known valve apparatus against the return force of a valve spring. When the outlet valve is opened, the pressure medium output, and hence the space lying between the inlet valve and the consumer, is purged to atmosphere. For purging, the known valve apparatus has a pressure medium outlet which leads to atmosphere via a damper. The pressure medium output is thus also connected fluidicly to the relay valve.

The pressure-actuatable outlet valve of the known valve apparatus is assigned an electrically actuatable purge valve which guarantees pre-control of the diaphragm valve. The electrically actuatable purge valve serves to control the purging of the outlet valve. Purging of the purge chamber creates pressure conditions at the valve diaphragm of the outlet valve which guarantee the desired opening of the outlet valve for the purpose of purging the consumer. In the known valve apparatus, a purge line controlled by the electrically actuatable purge valve opens into a pressure medium chamber upstream of the inlet valve in the flow direction, so that purging takes place via the relay valve.

For operation of a pressure-actuated brake system, in particular as part of an anti-lock brake system, purging of the outlet valve desirably takes place as quickly and completely as possible, so that the full opening cross section of the outlet valve is available for purging the consumer. It has been found that, in operation of the known valve apparatus, purging of the outlet valve often does not take place quickly enough to meet the requirements. Measurement of the purge times has revealed that the purge time of the brake cylinder, even after normal braking processes, is too long.

SUMMARY OF THE INVENTION

The present invention is based on the object of refining the valve apparatus of the generic type so as to guarantee as rapid and complete a purging of the diaphragm valves as possible.

This object is achieved according to the invention by a valve apparatus, in which the purge line of a diaphragm valve is fluidicly connected to the control input of the relay valve. In this way both the inlet valve and the outlet valve, or both valve types, can be purged via the control input of the relay valve. The at least one diaphragm valve (inlet valve and/or outlet valve), which is purged according to the invention via the control input of the relay valve, has as a closing member a valve diaphragm which lies on a valve seat and opens against the pressure in a purge chamber of the inlet valve. The diaphragm valve is assigned an electrically actuatable valve which controls a fluidic connection of the purge chamber of the inlet valve to a purge leading to atmosphere. The valve combination of the inlet valve and outlet valve for filling and purging the consumer can thus be pre-controlled precisely via electrically actuatable valves. The electric valves may be arranged space-savingly in the housing of the valve apparatus.

The outlet valve is thus not purged—as in a conventional valve apparatus—by a common purge with the consumers, i.e. the brake cylinders. Rather, purging of the outlet valve takes place via the control input of the relay valve. The invention is therefore based on the knowledge that, when purging the outlet valve via a common ventilation channel with the brake cylinders, a substantial back pressure occurs which is only slowly dissipated on purging via the common purge channel. With purging according to the invention via the control input of the relay valve, there is no back pressure and so the pressure in the purge line of the outlet valve or inlet valve falls rapidly and completely. To purge the outlet valve or inlet valve, only a small volume need be dissipated which can easily be purged via the control input of the relay valve without a back pressure being formed.

If the purge line of an inlet valve is fluidicly connected to the control input of the relay valve, a rapid ventilation of the purge chamber of the inlet valve is possible independently of the back pressure upstream of the consumer. The control input in any case provides a sufficient volume to provide the low volume required for filling the purge chamber of the inlet valve.

In a diaphragm valve, the purge chamber of which is connected according to the invention to the control input of the relay valve, in contrast to the conventional construction, no valve springs are required to provide return force since the pressure of the control input always reaches the diaphragm considerably more quickly than the corresponding pressure on the other side.

The diaphragm valves have different active areas on the two sides of the valve diaphragms so that, on pressure balance, a resulting return force because of the active area difference presses the valve diaphragm against the valve seat. On the outlet valve, the active faces on the two sides of the valve diaphragm are configured such that the pre-control pressure, which can be switched according to the invention to the purge chamber of the outlet valve, at the control input of the relay valve holds the outlet valve in the closed position.

Advantageously, the outlet valve and/or inlet valve has a valve spring acting on the valve diaphragm, and opens against the return force of the valve spring. The return force to be overcome by the pressure forces acting on the valve diaphragm on opening of the diaphragm valve is thus applied by the valve spring. In further embodiments, the return force of the respective diaphragm valve is determined by a combination of forces because of the active area difference and an additional valve spring.

In a preferred embodiment of the invention, the valve apparatus has a working valve device, the housing of which comprises the relay valve, the control input of the relay valve and a second portion, opening into the control input, of the purge lines according to the invention of the at least one diaphragm valve (inlet valves and/or outlet valves). Also, the valve apparatus has at least one control valve device, the housing of which comprises a pressure medium output, the outlet valve assigned to the pressure medium output, the inlet valve assigned to the pressure medium output, the electrically actuatable valves and the fluidic connection of each electrically actuatable valve to the purge chamber of the respectively assigned diaphragm valve (inlet valve 23, outlet valve 28). The first portions of the purge lines according to the invention to the electrically actuatable valves for purging the diaphragm valves are also integrated in the housing of the control device. In this way, a compact assembly is produced which combines the control of the filling and purging of consumers in a brake system of a motor vehicle, in particular an anti-lock braking system, with a relay valve. The housings of the control valve device and the working valve device may be configured space-savingly and combined.

In a particularly preferred embodiment of the invention, the valve apparatus comprises a plurality of control valve devices which are connected to the same working valve device. In a compact assembly, the respective control valve devices co-operate with the working valve device and are supplied with compressed air from there. The outlet valves of the respective control valve devices are purged according to the invention via the control input of the relay valve of the working valve device.

In a valve arrangement with a plurality of pressure medium outputs for connection of a plurality of consumers, several of the inlet or outlet valves for the respective pressure medium output may be configured as diaphragm valves and according to the invention be purged via the control input of the relay valve. In an advantageous embodiment, each outlet valve is formed as a diaphragm valve and the respective purge line is fluidically connected to the control input of the relay valve.

In a further advantageous embodiment, each inlet valve is configured as a diaphragm valve and the respective purge line is fluidically connected to the control input of the relay valve.

The outlet valve with its valve diaphragm controls a working line which is formed in the housing of the respective control valve device and creates a purge via the main purge leading to atmosphere. The main purge is here formed in the housing of the working valve device, wherein the working valve device has ports for fluidic connection to the working lines of the connected control valve devices.

Advantageously, the electrically actuatable valves of the respective pressure-actuated diaphragm valves (outlet valves and/or inlet valves) are arranged in the region of the contact face of the housing of the control valve device and the working valve device, leading to easy assembly of the electric valves at low cost for the electric supply. The electric valves of the outlet valves and the electric valves of the inlet valves are here particularly advantageously arranged in a control chamber of the housing of the control valve device. All electric valves can thus be inserted on installation of the valve apparatus from the contact face of the housing of the control valve device. In particular, in this way the portion of the purge line lying according to the invention between the electric valve and the control input of the relay valve may be formed exclusively in the housing of the working valve device. To create the valve apparatus according to the invention therefore, almost no changes are required to the configuration of the control valve device in comparison with known valve devices, since the purge devices for purging the outlet valve and/or the inlet valve of each control valve device are arranged mainly or exclusively in the housing of the working valve device.

The main purge of the pressure medium output leading to atmosphere is advantageously connected to the environment of the housing of the working valve device via a silencer on the housing, so that noise development on purging of large volumes is suppressed. The purging of the small volumes of the purge chambers of the diaphragm valves via the control input of the relay valve is decoupled from the main purge via the silencer, so that firstly a rapid and complete purging of the outlet valve or filling of the inlet valve is possible, and at the same time the noise development on purging of the brake cylinders is suppressed.

The purging/filling of the diaphragm valves can be controlled precisely when the electrically actuatable valves are formed as 3/2-way valves. With a compact valve structure, the 3/2-way valves can be accommodated in a common valve chamber.

When the electrically actuatable valves are formed as 3/2-way valves with a supply port and two alternatively switchable outputs, the supply port of the valve is connected to the purge chamber of the outlet valve. The first working port of the electrically actuatable valve is fluidicly connected to the main purge leading to atmosphere, and the second working port is fluidically connected to the control input of the relay valve. The supply port of the electrically actuatable valve can therefore be connected alternatively via the first working port to the main purge leading to atmosphere or via the second working port to the control input of the relay valve. In this way, the electrically actuatable valve can be switched by voluntary electrical control between two valve positions. In a first, closed (unpowered) valve position of the electrically actuatable valve, the pressure at the control input of the relay valve is switched to the purge chamber of the outlet valve, whereby the purge chamber of the outlet valve is rapidly purged. The valve diaphragm of the outlet valve is held in the closed position by the return force acting on the valve diaphragm and produced by different active areas on the two sides of the valve diaphragm, and/or a valve spring. In the second valve position, the electric purge valve is powered and connects the purge chamber of the outlet valve to the main purge leading to atmosphere, in particular via the working line of the respective control valve device opening into the main purge. In this valve position of the electrically actuatable valve, the outlet valve yields under the pressure at the pressure medium output, i.e. upstream of the consumer, and opens.

Accordingly, with a 3/2-way valve for purging the inlet valve, the supply port is connected to the purge chamber of the inlet valve. One of the working ports is fluidicly connected to the control input of the relay valve, and the other working port to the main purge leading to atmosphere.

Exemplary embodiments of the invention are explained below with more detail with reference to the drawings. The drawings are provided for purely illustrative purposes and are not intended to limit the scope of the present invention.

DETAILED DESCRIPTION OF THE DRAWINGS

Figure 1:
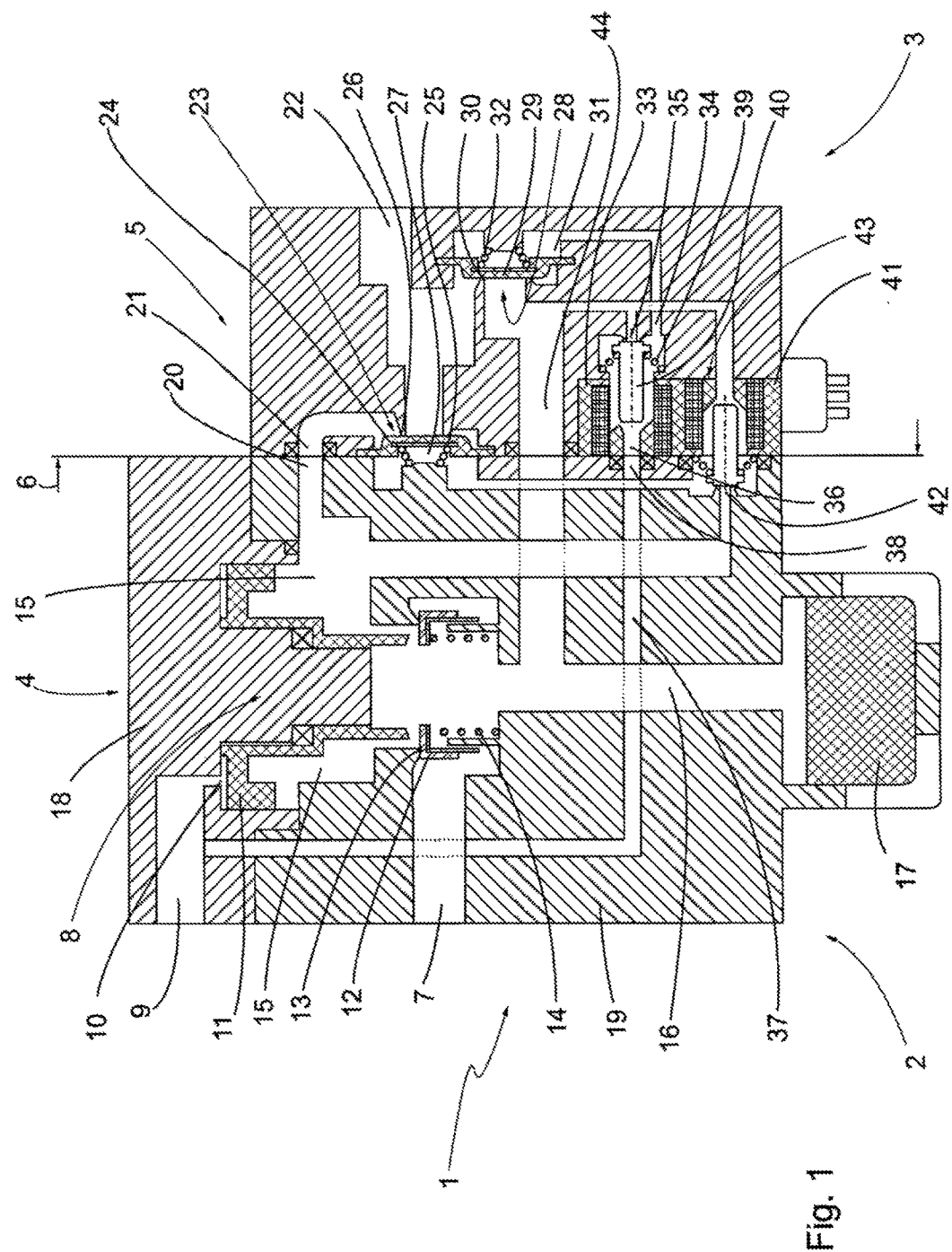
FIG. 1 shows a section view of a first exemplary embodiment of a valve apparatus.

In all exemplary embodiments, the same components carry the same reference numerals.

FIG. 1 shows a valve apparatus 1 for a pressure-actuated braking device of a motor vehicle. The valve apparatus 1 is used in a brake system with an anti-lock brake system (ABS). The valve apparatus has a working valve device 2 and a control valve device 3, the respective housings 4, 5 of which are combined into one unit. The housing 4 of the working valve device 2 and the housing 5 of the control valve device 3 are combined on a common flat contact face 6.

The working valve device 2 has a pressure medium input 7 to which a pressure source (not shown) can be connected. The working valve device 2 also has a relay valve 8 which controls the pressure medium input 7 and is pressure-actuatable via a control input 9. The pressure in the control input 9 acts in a control chamber 10 on a relay piston 11 arranged to be linearly moveable. The relay piston 11 is the actuating means for the valve member of the relay valve 8, which is formed as a valve ring 12 and is held on a valve seat 13 by a valve spring 14 in the closed position. In the closed position of the relay valve 8, the valve ring 12 separates the pressure medium input 7 from a pressure medium chamber 15 which the relay piston 11 delimits on its side opposite the control chamber 10. Via the internal diameter of the valve ring 12, a purge 16 leading to atmosphere is formed in the housing 4. The purge 16 extends through the wall of the housing 4 to atmosphere, so that pressure medium can be dissipated via a silencer 17 on the housing 4 of the working valve device 2.

In this exemplary embodiment, the housing 4 of the working valve device 2 is formed in two parts, wherein a cover 18 guides the relay piston 11 and is mounted on the underside 19 of the housing 4.

By a corresponding setting of the pre-control pressure at the control input 9 of the relay valve 8, the pressure medium chamber 15 can be fluidicly connected to the pressure medium input 7 or to the purge 16, or blocked against both.

In the region of the contact face 6 of the housing 4, the pressure medium chamber 15 has a port 20 which aligns with the input port 21 of the control valve device 3. The control valve device 3 has a pressure medium output 22 to which a consumer, in particular a brake cylinder of a motor vehicle, can be connected. A fluidic connection between the input port 21 of the control valve device 3 and the pressure medium output 22 is controlled by an inlet valve 23 formed as a diaphragm valve. The inlet valve 23 comprises as a valve member a valve diaphragm 24 which is clamped in the region of the contact face 6 between the housings 4, 5. The valve diaphragm is flexible and is held in the closed position on a valve seat 26 by a valve spring 25. The valve diaphragm 24 here delimits a purge chamber 27. If the pressure in the pressure medium chamber 15 exceeds the pressure in the purge chamber 27 by such an amount that the valve spring 25 is overcome, the inlet valve 23 opens the fluidic connection to the pressure medium output 22, whereby the connected consumer is activated.

The control valve device 3 comprises an outlet valve 28 also formed as a diaphragm valve and arranged downstream of the inlet valve 23 in the actuation direction to the consumer. The outlet valve 28 has a valve diaphragm 29 which lies on a valve seat 30 when the outlet valve 28 is in the closed position, and closes a working line 44 formed in the housing 5 of the control valve device 3 and opening into the main purge 16 of the working valve device 2. The working line 44 thus forms a fluidic connection between the pressure medium output 22 and the main purge 16, which connection is closed by the outlet valve 28 and opened when the outlet valve 28 is opened.

The valve diaphragm 29 closes a purge chamber 31 of the outlet valve 28, wherein the static pressure in the purge chamber 31 then acts on the outlet valve 28. When the purge chamber 31 is purged, the outlet valve 28 opens and allows purging of the pressure medium output 22 or the consumer connected to the pressure medium output 22.

Here the outlet valve 28 has differently sized active faces on the two sides of the valve diaphragm 29, whereby static pressure on the respective active face generates different forces. The outlet valve 28 thus opens against a return force which generates the pressure in the purge chamber 31 via the active face of the valve diaphragm on the side of the purge chamber 31. In the exemplary embodiment shown, the outlet valve 28 furthermore has a valve spring 32 which presses the valve diaphragm 29 in the direction of the valve seat 30 and generates an additional return force which must be overcome to open the diaphragm valve. The outlet valve 28 thus opens against the pressure in the purge chamber 31 and the return force of the valve spring 32.

An electrically actuatable valve 33, formed as a 3/2-way valve, is assigned to the outlet valve 28. A supply port 34 of the electrically actuatable valve 33 can be fluidicly connected alternatively via a first working port 35 to the main purge 16 leading to atmosphere, or via a second working port 36 to the control input 9 of the relay valve 8. For this, the first working port 35 is connected to the working line 44. A purge line 37 is connected to the second working port 36 of the electrically actuatable valve 33 and opens into the control input 9.

The purge line 37 is formed in the housing 4 of the working valve device 2 and has a port 38 in the region of the contact face 6 which, in the installation position of the electrically actuatable valve 33, lies overlapping with the second working port 36 so that a fluidic connection exists. In the unpowered position of the electrically actuatable valve 33 shown, there is a fluidic connection between the purge chamber 31 of the outlet valve 28 and the control input 9 of the relay valve 8, so that the pre-control pressure predominating in the control input 9 is switched through to the purge chamber 31 of the outlet valve 28. The pre-control pressure here holds the outlet valve 28 in the closed position. The active face of the valve diaphragm 29 is larger on the side of the purge chamber 31 than on the side of the working line 44, so that the outlet valve 28 opens and hence the consumers are purged only after overcoming the return force produced by the pre-control pressure in the purge chamber 31 via the larger of the two active faces of the valve diaphragm 29.

In the exemplary embodiment shown, the outlet valve 28 has an additional valve spring 39 which exerts a return force in the direction of the valve seat 30. In this valve position, the consumers connected to the pressure medium output 22 can be activated.

The purge chamber 31 of the outlet valve 28 can be purged very rapidly via the purge line 37 independently of the purging of the pressure medium output 22, so that on purge request, the entire valve cross section is available.

The inlet valve 23, also formed as a diaphragm valve, is assigned an electrically actuatable valve 41, also formed as a 3/2-way valve. A supply port 42 of the electrically actuatable valve 41 is connected to the purge chamber 27 of the inlet valve 23. A first working port 45 is connected to the pressure medium chamber 15 and a second working port 46 is connected to the main purge 16. In a first valve position, the electrically actuatable valve 41 connects the supply port 42, and hence the pressure medium chamber 15, to the purge chamber 27 of the inlet valve 23. In the second valve position, the electrically actuatable valve 41 connects the supply port 42 to the purge 16 leading to atmosphere. In this way, the electrically actuatable valve 41 can if required fill the purge chamber 27 of the inlet valve 23, in order to allow closure of the inlet valve 23 during purging of the connected consumers (ABS function).

The electrically actuatable valves 33, 41 are received in a valve chamber 43 which is received in the housing 5 of the control valve device 3 in the region of the contact face 6. In this way, the electric valves are easy to install. Also, when assembling the housings 4, 5 of the working valve device 2 and control valve device 3 via the contact face 6 with corresponding annular seals, a fluidic connection can be created between the purge valve 33 and the purge line 37 leading to the control input 9.

In further exemplary embodiments, a plurality of control valve devices 3 of substantially similar structure are connected to the working valve device 2, so that a plurality of pressure medium outputs and pressure medium consumers connected thereto (in particular brake circuits) can be supplied with pressure medium and actuated. The purge chamber of at least one outlet valve, preferably of several or all outlet valves, is purged via a purge line opening into the control input of the relay valve.

Figure 2:
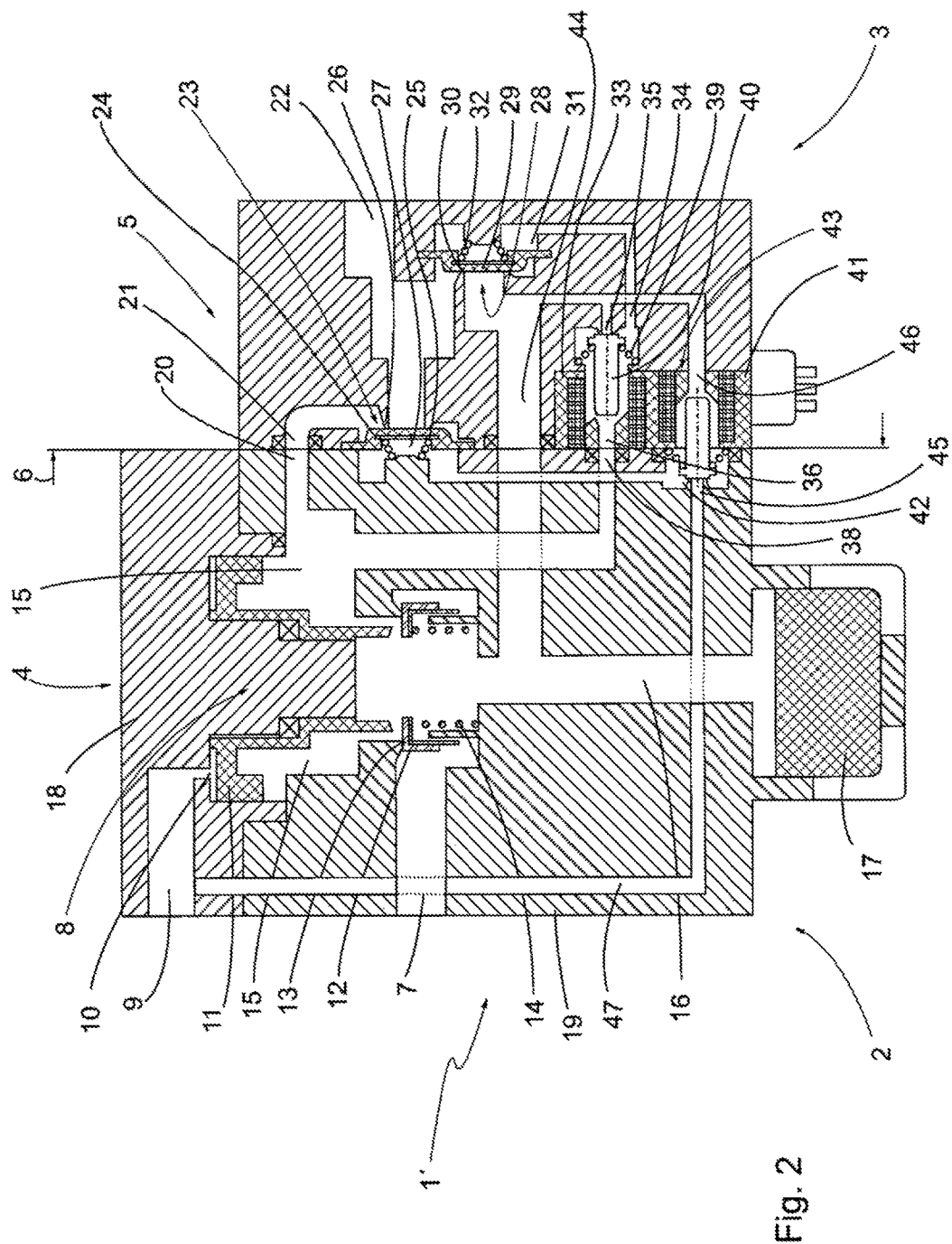
FIG. 2 shows a section view of a second exemplary embodiment of a valve apparatus.

FIG. 2 shows an exemplary embodiment of a valve apparatus 1' for a pressure-actuated brake device of a motor vehicle which, apart from the differences below, corresponds to the exemplary embodiment of FIG. 1.

The valve apparatus 1' comprises a working valve device 2 to which, in this exemplary embodiment, one or more control devices 3 are connected. In contrast to the exemplary embodiment in FIG. 1, the purge chamber 27 of the inlet valve 23 can be fluidicly connected to the control input 9 of the relay valve 8 via the electrically actuatable 3/2-way valve 41 assigned to the inlet valve 23. For this, the first working port 45 of the electrically actuatable 3/2-way valve 41 is connected via a purge line 47 to the control input 9, and the second working port 46 to the working line 44 which communicates with the main purge 16 of the valve apparatus 1'. The supply port 48 of the electrically actuatable 3/2-way valve 41 is connected to the purge chamber 27 of the inlet valve 23.

The electrically actuatable 3/2-way valve 41 thus connects the purge chamber 27 of the inlet valve 23 alternatively to the main purge 16 or to the control input 9 of the relay valve 8.

Figure 3:
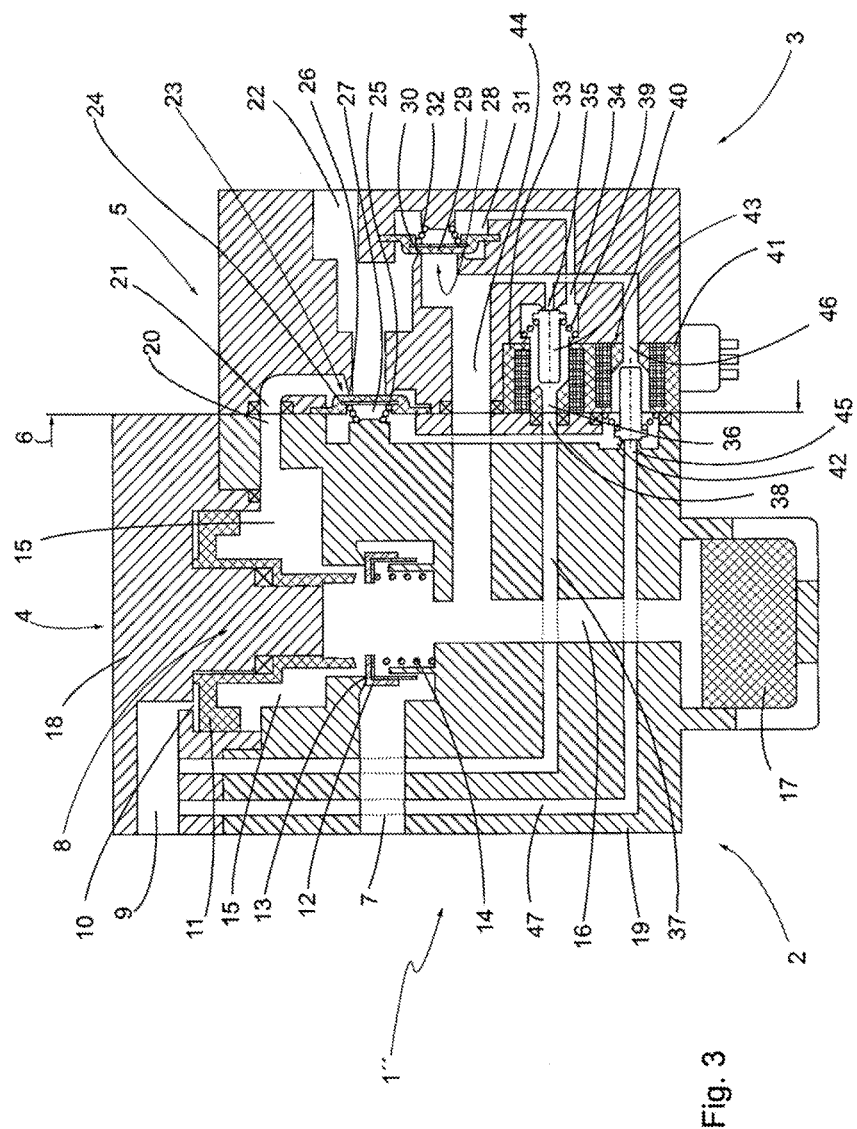
FIG. 3 shows a section view of a third exemplary embodiment of a valve apparatus.

FIG. 3 shows an exemplary embodiment of a valve apparatus 1" for a pressure-actuated brake device of a motor vehicle which, apart from the differences below, corresponds to the exemplary embodiment in FIG. 1.

In the exemplary embodiment according to FIG. 3, both the purge chamber 27 of the inlet valve 23 and the purge chamber 31 of the outlet valve 28 can be fluidicly connected to the control input 9 of the relay valve 8 by means of the respective electrically actuatable valves 33, 41. Therefore the electrically actuatable valve 33 of the outlet valve 28 according to the invention is connected to the control input 9 via a purge line 37, and the electrically actuatable valve 41 of the inlet valve 23 is connected to the control input 9 via a purge line 47.

If a plurality of control valve devices 3 is provided, several or all inlet valves and/or outlet valves can be arranged in a connectable manner to the control input. Individual inlet valves and/or outlet valves may, in further exemplary embodiments not shown, be configured in a different structure to that of the diaphragm valve, as required or according to requirements of the desired pressure medium consumer.

The invention claimed is:

1. A valve apparatus for a pressure-actuated system, comprising:
    a pressure medium input (7) configured to connect to a pressure source,
    a relay valve (8) which controls the pressure medium input (7) and is configured to be actuated via a control input (9) of the valve apparatus (1),
    at least one pressure medium output (22) configured to connect to a consumer,
    for each of the at least one pressure medium output (22) a pressure-actuated outlet valve (28) which controls a fluidic connection of the at least one pressure medium output (22) to a main purge (16) leading to atmosphere of the valve apparatus (1), and
    for each of the at least one pressure medium output (22) a pressure-actuated inlet valve (23) arranged between the relay valve (8) and the at least one pressure medium output (22),
    wherein at least one of the pressure-actuated outlet valve (28) or of the pressure-actuated inlet valve (23) is formed as a diaphragm valve and has as a closing member a valve diaphragm (24, 29) which lies on a valve seat (26, 30) and opens against pressure in a purge chamber (31) of the pressure-actuated outlet valve (28) or against the pressure in a purge chamber (27) of the pressure-actuated inlet valve (23),
    wherein each diaphragm valve is assigned an electrically actuatable valve (33, 41) which controls a fluidic connection of the purge chamber (27, 31) to a purge line, wherein the purge line (37, 47) of at least one diaphragm valve is fluidicly connected to the control input (9) of the relay valve (8).

2. The valve apparatus as claimed in claim 1, wherein each pressure-actuated outlet valve (28) is formed as a diaphragm valve and the respective purge line (37) is fluidicly connected to the control input (9) of the relay valve (8).

3. The valve apparatus as claimed in claim 1, wherein each pressure-actuated inlet valve (23) is formed as a diaphragm valve and the respective purge line (47) is fluidicly connected to the control input (9) of the relay valve (8).

4. The valve apparatus as claimed in claim 1, wherein the pressure-actuated outlet valves (28) and/or the pressure-actuated inlet valves (23) have a valve spring (25, 32) acts on the valve diaphragm (24, 29) and wherein at least one of the pressure-actuated outlet valve (28) or the pressure-actuated inlet valve (23) opens against the return force of the valve spring (25, 32).

5. The valve apparatus as claimed in claim 1 any of the preceding claims, wherein the valve apparatus (1, 1', 1") has a working valve device (2) with a housing (4) accommodating the pressure medium input (7), the relay valve (8), the control input (9) and the purge lines (37, 47), and that the valve apparatus (1, 1', 1") has at least one control valve device (3), the with a housing (5) accommodating the at least one pressure medium output (22), the pressure-actuated outlet valve (28) assigned to the at least one pressure medium output (22), the pressure-actuated inlet valve (23) assigned to the at least one pressure medium output (22), the electrically actuatable valves (33, 41) and the fluidic connection of each electrically actuatable valve (33, 41) to the purge chamber (31, 27) of the diaphragm valve (23, 28).

6. The valve apparatus as claimed in claim 5,
wherein the electrically actuatable valves (33, 41) are arranged in the region of a common contact face of the housing (4, 5) of the respective control valve device (3) and working valve device (2).

7. The valve apparatus as claimed in claim 5,
wherein the electrically actuatable valves (33, 41) are arranged in a valve chamber (43) of the housing (5) of the control valve device (3).

8. The valve apparatus as claimed in claim 5, wherein a main purge (16) leading to atmosphere is connected to an environment of the housing (4) via a silencer (17) on the housing (4).

9. The valve apparatus as claimed in claim 1,
wherein the electrically actuatable valves (33, 41) are formed as 3/2-way valves.

10. The valve apparatus as claimed in claim 9, wherein supply ports (34) of the electrically actuatable valves (33, 41) are connected to the purge chambers (27, 31) of the respectively assigned diaphragm valve (23, 28) and are configured to be connected alternatively via a first working port (35) of the electrically actuatable valve (33, 41) to a main purge (16) leading to atmosphere or via a second working port (36) to the control input (9) of the relay valve (8).

11. The valve apparatus as claimed in claim 5,
comprising a plurality of control valve devices (3) connected to the same working valve device (2).

* * * * *